United States Patent [19]
Schinkel et al.

[11] Patent Number: 4,668,575
[45] Date of Patent: May 26, 1987

[54] HEAT SEALABLE MULTILAYER FILMS WITH LOW PERMEABILITY TO GAS AND THEIR USE AS PACKAGING MATERIAL

[75] Inventors: Ingo Schinkel; Jürgen Böhner, both of Walsrode, Fed. Rep. of Germany

[73] Assignee: Wolff Walsrode Aktiengesellschaft, Walsrode, Fed. Rep. of Germany

[21] Appl. No.: 861,765

[22] Filed: May 9, 1986

[30] Foreign Application Priority Data

Jun. 12, 1985 [DE] Fed. Rep. of Germany ....... 3520944

[51] Int. Cl.$^4$ .............................................. B32B 27/00
[52] U.S. Cl. .................................... 428/349; 428/518; 428/520; 428/900
[58] Field of Search ............... 428/516, 500, 515, 518, 428/349, 910, 520, 35

[56] References Cited

U.S. PATENT DOCUMENTS

| | | | |
|---|---|---|---|
| 3,645,992 | 2/1972 | Elston | 526/169.2 |
| 4,011,382 | 3/1977 | Levine et al. | 526/96 |
| 4,547,433 | 10/1985 | Ohya et al. | 428/36 |
| 4,617,241 | 10/1986 | Mueller | 428/522 |

*Primary Examiner*—Edith Buffalow
*Attorney, Agent, or Firm*—Sprung Horn Kramer & Woods

[57] ABSTRACT

Heat sealable, composite film comprising a polypropylene film, at least one adhesion layer, at least one gas-barrier layer and at least one heat-sealing layer of a linear statistical ethylene copolymer of low density.

10 Claims, No Drawings

HEAT SEALABLE MULTILAYER FILMS WITH LOW PERMEABILITY TO GAS AND THEIR USE AS PACKAGING MATERIAL

The present invention relates to a heat sealable orientated multilayer film which, owing to its gas-barrier properties, is particularly suitable as a packaging film for products which require low gas permeability and aroma protection.

The use of composite films of polyolefins having a heat sealable layer of ethylene homo- or copolymers, as a packaging film, has been known for a long time. Attempts have also already been made to improve the gas impermeability of such composite films by incorporating a layer of saponified ethylene vinyl acetate. Thus in DOS (German Offenlegungsschrift) No. 2,644,209 a composite film of polypropylene, an adhesion-promoting layer of modified polyolefin, a layer of saponified ethylene vinyl acetate copolymer and, optionally, a heat-sealable layer of polyolefins, is described. According to the teaching in E-OS (European Offenlegungsschrift) No. 0,062,815 it is possible to considerably improve the processing properties of these composite films. However, for some fields of application of these films, the temperature at which sufficiently strong sealing seams are formed is too high and/or the gas-barrier properties are not completely satisfactory.

Thus there is a need for multilayer films, in particular packaging films, which not only have a high sealing strength at low sealing temperatures, and good optical properties, but also have excellent machine compatibility in the customary packaging machines of various types and excellent gas-barrier properties.

Subject of the present invention is therefore a heat sealable at least monoaxially orientated multilayer film consisting of propylene polymers as the base layer, upon at least one surface of which a layer combination is arranged which, from the outside towards the base layer, is composed of
(A) a heat sealable outer layer of
  (a) 66.5 to 94.5, preferably 78 to 89.1% by weight of a linear statistical ethylene copolymer of low density (LLDPE),
  (b) 5 to 30% by weight, preferably 10 to 20% by weight, of a low molecular weight resin compatible with the LLDPE, with the exception of a low molecular weight resin of α-olefins containing at most 3 C-atoms, such as low molecular weight polypropylene or polyethylene,
  (c) 0.3 to 2, preferably 0.5 to 1% by weight, of a mixture of a polyethylene wax and an oxazoline wax,
  (d) 0.2 to 1.5, preferably 0.4 to 1% by weight of polydiorganosiloxane and
  (e) optionally customary additives and auxiliaries, the sum of the components (a) to (d) always amounting to 100% by weight.
(B) optionally a layer of a propylene polymer,
(C) an adhesion layer containing modified polyolefin,
(D) a gas-barrier layer based on a saponified ethylene vinyl acetate copolymer containing perferably 40 to 85 mol% of vinyl acetate units which are saponified to an extent of at least 90%,
(E) an adhesion layer containing modified polyolefin, and optionally
(F) a layer of LLDPE and optionally components (b)–(e) in the above mentioned amounts the base layer optionally carrying on its other surface a sealable layer A, a combination of the layers A to E, a combination of the layers A to F, a combination of the layers B to D or a combination of the layers E and D or one layer of a mixture of the polymers of layer C and D.

It is also possible to combine layers A and C and/or layers B and C and/or layers E and F or layers C and D and/or layers D and E to form one layer by mixing the corresponding two polymers.

The base layer and the layer B of the sealable multilayer film according to the invention consists of a propylene polymer which contains up to at most 10% by weight of another α-olefin containing at most 8 C-atoms, preferably ethylene. Preferably an isotactic polypropylene with a density of 0.9 to 0.91 g per cm$^3$ and a melt flow index of 1 to 4 g/10 minutes at 230° C./21.6N (according to DIN 53 735) is used. Preferably layer B and the base layer consist of the same polymer.

The base layer can contain 3–15% by weight, preferably 8–12% by weight of additives which are incompatible with the propylene polymers, preferably an inorganic additive such as $CaCO_3$, $SiO_2$, Na-Al silicate and/or $TiO_2$, by means of which the inventive film is rendered opaque.

The base layer can however also contain an organic incompatible additive, preferably polystyrene, polymethyl methacrylate, polytetrafluorethylene and/or copolymers of these compounds.

Incompatible means that such polymeric additives have a different melting point and/or a different stretching ratio from that of the propylene polymer. Because of this fact the polymer matrix is torn apart and vacuoles are formed during the orientation process, as by using inorganic additives.

The main constituent of the sealable layer and layer E, is a linear statistical ethylene copolymer of low density, which is produced by copolymerising ethylene with up to 12 mol%, preferably 2–8 mol%, of α-olefins with $C_3$ to $C_{10}$, preferably with propylene, 1-butene, pentene, hexene, octene, nonene, decene or 4-methyl-1-pentene, particularly preferably 1-butene, hexene or octene, under polymerisation conditions, under which polyethylene of high density is normally obtained, i.e. at low pressures and temperatures in the presence of organometallic catalysts. Processes for the preparation of linear ethylene copolymers with low density are described in U.S. Pat. Nos. 3,645,992 and 4,011,382. The ethylene copolymers which are used according to the invention should have a density lower than 0.94, preferably a density of 0.900 to 0.925, particularly preferably 0.903 to 0.92 g/cm$^3$.

Natural or synthetic resins with a softening point of 60° to 180° C., preferably 80° to 100° C., can be used as low molecular weight resins which are compatible with the LLDPE. These resins can be considered as compatible which can be added to the sealing layer in a concentration of up to 30% by weight without any deterioration in the optical properties of the film. Rosin, dammar resins, turpentine resins, hydrocarbon resins, ketone resins, phenolic resins, chlorinated aliphatic or aromatic hydrocarbon resins can be used for this purpose. These resins are described in Ullmanns Encyclopädie der technischem Chemie (Ullmann's Encyclopedia of Technical Chemistry) Vol. 12, 1976, pages 525 to 555.

Examples of the natural resins are rosin and dammar resins. The former is obtained by distilling off turpentine oil from the resins of pines or root stocks. It is also to be understood to include rosin esters and also modified rosin, such as dehydrogenated, hydrogenated or fractionated rosin.

Dammar resins are also natural resins in the form of colourless to yellow materials which are also obtained by natural resin exudation.

The term hydrocarbon resins refers to polymers of carbon and hydrogen which are obtained in the distillation of coal tar during the cracking of naphtha or gas oil from coke-oven gas or from turpentine oil. Typical examples of these resins are coumarone resins, petroleum resins, terpene resins, styrene resins, cyclopentadiene resins. Coumarone resins are to be understood to be hydrocarbon resins which are obtained from coke-oven gas or by polymerization of resin-forming compounds of the type encountered in coal tar distillation processes, modified coumarone resins being obtained by copolymerization with phenol.

The raw material base from which the petroleum resins are produced is obtained in the cracking of naphtha or gas oil. Resin-forming compounds are inter alia butene, butadiene, pentene, piperylene, isoprene, cyclopentadiene, dicyclopentadiene, alkyl benzenes, methyl dicyclopentadiene, methyl indene, naphthalene styrene indene, vinyl toluene, methyl styrene.

Low molecular weight homopolymers of styrene and other copolymers, such as α-methyl styrene, vinyl toluene and butadiene, as also suitable low molecular weight resins.

The cyclopentadiene resins are obtained from coal tar distillates and separated petroleum gases. The polymers are obtained by exposing the unsaturated compounds to high temperatures over a prolonged period of time.

The terpene resins are obtained by polymerization of terpenes, such as for example, β-pinene, α-pinene, dipentene, limonene, myncene, bornylene, camphene and similar terpenes.

The chlorinated aliphatic or aromatic hydrocarbons generally contain 30 to 70%, by weight, of chlorine and are known by the name chlorine waxes or are derived from bephenyl chloride, terphenyl or mixtures thereof.

The hydrocarbon resins mentioned may also be used in the form of modified products, in which case modification is possible by copolymerization with specific monomers or by reaction with other polymers, but especially by hydrogenation or partial hydrogenation of the unsaturated constituents of the resins. Preferably hydrogenated polycyclic hydrocarbon resins based on cyclopentadiene are used.

Phenolic resins obtained by reaction of phenols and aldhehydes are also suitable. In addition to phenol, cresol, xylenol, paraphenylphenol may be condensed with formaldehyde, furfuryl aldehyde or acetaldehyde.

The sealable layer (A) contains as component (c) a mixture of a polyethylene wax and an oxazoline wax prepared from stearic acid and an amino alcohol. Tris-hydroxymethylaminomethane is preferably used as the amino alcohol. The weight ratio in which the two components are mixed may be varied over a wide range, the preferred ratio being 1:1.

In addition, the sealable layer contains polydiorganosiloxanes or mixtures thereof which have a kinematic viscosity at 25° C. of at least 100 mm² per second. Suitable polydiorganosiloxanes are polydialkylsiloxanes, polyalkylphenylsiloxanes, olefin-modified siloxane oils, polyether-modified siloxane oils, olefin/polyether-modified silicone oils, expoxy-modified silicone oils and alcohol-modified silicone oils, polydialkylsiloxanes preferably containing 1 to 4 carbon atoms in the alkyl group; in particular polydimethylsiloxane is especially suitable. The polydiorganosiloxanes should preferably have a kinematic viscosity at 25° C. of at least $10^5$ mm²/second, particularly preferably of at least $10^6$ mm²/second.

The gas-barrier layer D is preferably built from an ethylene/vinyl acetate copolymer which consists of 40 to 85 mol%, preferably 60–75 mol% of vinyl acetate units which are saponified to an extent of at least 90%, preferably to an extent of more than 95 mol%. The limiting viscosity number ($\eta$) of the polymers, measured in a solvent mixture of 85% by weight of phenol and 15% by weight of water should preferably be between 0.07 and 0.17 l/g, particularly preferably between 0.09 and 0.15 l/g.

The gas-barrier layer which serves in particular as a barrier layer for oxygen and/or aromas, may contain even further polymers with gas-barrier properties such as for example polyvinyl alcohol or polyamides. Mixtures of ethylene/vinyl alcohol copolymers and 10–60% by weight of polyamide are particularly preferred. Polyamide 6,12 of polyamide 6,6 are particularly suitable as polyamides.

Suitable mixtures are also those of the type described in EP No. 0 064 330 A₁ and EP No. 0 063 006 A₁, in which mixtures of ethylene/vinyl alcohol copolymers and polyamides which additionally contain suitable plasticizers are used for the production of the gas-barrier layer.

Modified polyolefins are preferably used for the production of the adhesion layers. They are preferably homo- or copolyolefins containing carboxyl groups, such as, for example, polypropylene or polyethylene which contain, in a grafted form, at least one monomer from the group comprising the α,β-mono-unsaturated dicarboxylic acids, such as, for example, maleic acid, fumaric acid, itaconic acid or their acid anhydrides, acid esters, acid amides and acid imides, copolymers of ethylene and α,β-monounsaturated carboxylic acids, such as acrylic acid, methacrylic acid and/or their metal salts (Zn, Na) and/or their alkyl (C₁–C₄) esters or corresponding graft polymers of said monomers on polyolefins such as polyethylene or polypropylene; or partially saponified ethylene/vinyl acetate copolymers, which are optionally graft-polymerized with a monomer of the above mentioned unsaturated acids and have a low degree of saponification; or mixtures of the mentioned polymers.

Polyolefins such as polypropylene or copolymers of propylene and ethylene, with a maximum of 1.0% by weight of grafted-on α,β-monounsaturated dicarboxylic acid anhydride such as maleic acid anhydride or partially saponified ethylene/vinyl acetate copolymers, optionally mixed with polyolefins, are particularly preferred.

If the adhesion polymer is incorporated either in the sealable layer A and/or in layer B or in the gas-barrier layer D, preferably up to 40% by weight, preferably 25 to 30% by weight, based on the layer-forming polymer, are used.

The layers may contain the known additives and auxiliaries, such as, for example, lubricants, antiblocking agents and antistatic agents, in the usual quantities. Thus it is possible to use unsaturated fatty acid amides, saturated fatty acid amides, such as, for example, stearic acid amide, erucic acid amide, thermoplastic polymers which are incompatible with the polymer of the sealing layer, such as, for example, polyamide-12, inorganic antiblocking agents, such as $SiO_2$, $CaCO_3$, or antistatic compounds, such as long-chain aliphatic tertiary amines, which may optionally be monounsaturated, such as ethoxylated tertiary amines, for example a N,N-bis(-2-hydroxyethyl) ($C_{12}$ to $C_{16}$)-alkylamine.

The multilayer films according to the present invention may be produced by customary methods, such as coating, lamination or melt (co)extrusion, it being possible to produce the combination of which the sealable layer consists by the master batch technique, but preferably by direct compounding.

The multilayer films according to the present invention are orientated at least monoaxially, preferably biaxially. They are orientated longitudinally, preferably in a ratio of 5:1 to 7:1 and transversely in a ratio of 7:1 to 10:1.

The multilayer film according to the invention preferably has a total thickness of 10 to 100 μm, particularly preferably of 25–50 μm, the base layer and the optionally included layer B forming the main proportion of the layer thickness.

The multilayer films according to the invention are particularly suitable as packaging material for oxygen-sensitive foods and as aroma protection and can be printed for this purpose and provided with tear-open strips.

In the following examples the following testing methods were used to determine the values.

Opacity was determined in accordance with ASTM D 1003-52.

The clarity and gloss of the film were determined using a photoelectric gloss meter according to Dr. B. Lange, Berlin, consisting of a low-voltage bulb and a condenser, which illuminate the specimen at 45°, and a second section, at 45° to the measuring plane, with a pinhole diaphram and a photocell. The gloss meter is connected to a finely adjustable indicating instrument (microammeter) which, in addition, contains the power supply and voltage stabilizer for the bulb. The gloss is defined as the proportion of light regularly reflected at 45° in %, based on a surface-silvered mirror as 100% standard. In test of the gloss, a polished black glass plate is mounted on the gloss meter as an intermediate standard because the silver mirror standard is not resistant to tarnish caused by air contamination. It has exactly 5% of the gloss of a surface-silvered mirror glass plate. Accordingly, the galvanometer reading of the photocell of the gloss meter is adjusted through the black glass intermediate standard in order to increase the accuracy of reading of the scale-graduation by the control potentiometer. The film to be tested is placed flat under the gloss meter on matt-black photographic paper transversely of the direction of travel, based on the optical axis of the gloss meter, and is measured at five satisfactory places. The galvanometer reading is divided by 10 and the average value is determined. The clarity of a film is defined as the proportion of light in % remaining after two passes of the film at 45°, based on the adjustment of the meter to 100% without a test film. To this end, the gloss meter is placed without a test film on a polished, high gloss chromium-plated iron plate and the galvanometer reading of the photocell of the gloss meter is adjusted by the control potentiometer to 100 scale units. Five test strips (3×15 cm) are cut longitudinally from the film to be tested by means of a metal template transversely of the film and are placed successively over two 9 mm tall and 29.5 mm wide brass flanges situated at 53 intervals of the chromium-plated iron plate and the gloss meter with its bottom opening is placed over them. The clarity of the film in % can then be directly read from the galvanometer. The average of the individual values is quoted.

To determine the strength of the sealing seams, sealing strength is tested under a high sealing pressure. Sealing strength is to be understood to be the force required to separate a sealing seam formed under defined conditions (50N per $cm^2$, 0.5 seconds) and the temperatures indicated in the Table. The sealing strength is expressed in Newtons and is based on a 15 mm wide test strip.

The measurement of the $O_2$-permeability is carried out according to DIN 53 380.

EXAMPLE

For layers A 0.5% by weight of a 1:1 mixtur of polyethylene wax and oxazoline wax, 0.3% by weight of polydimethylsiloxane with a kinematic viscosity of $10^6$, 0.5% by weight of N,N-bis-(2-hydroxyethyl)-($C_{12}$–$C_{16}$)-alkylamine and 0.1% by weight of silicon dioxide are incorporated into 98.6% by weight of a mixture of 80% by weight of an ethylene copolymer containing 6 mol-% of octene and having a density of 0.911 g/$cm^3$, a melting range of 120°–125° C. and a melt index of 7 g/10 min at 190° C./21.6N and of 20% by weight of a hydrogenated polycyclic resin based on cyclopentadiene (ESCOREZ 5000 ®) with a molecular weight (Mn) of 520 and a softening point of 85° C. The mixture thus produced is coextruded with a polypropylene containing 0.7% by weight of grafted-on saponified maleic anhydride with a melt index of 5 g/10 min at 250° C./21.6N as adhesion layers C and E and an ethylene/vinyl acetate copolymer containing 55 mol% of vinyl acetate units, which are saponified to an extent of 96%, as the gas-barrier layer D and the above-prepared mixture for layer A also as layer F. This layer combination was combined, by customary methods, with one surface the base film of polypropylene with a density of 0905 g/$cm^3$ a melt index of 3.3 g/10 min at 230° C./21.6N, whereas the other surface was combined with a separate layer A and the multilayer film was orientated in such a manner that a composite film was longitudinally orientated in a ratio of 5:1 and transversely orientated in a ratio of 10:1 was obtained.

The layer structure and the properties of the inventive film are listed in the following table.

TABLE

| | layer structure | layer thickness in μm |
|---|---|---|
| A | Mixture of LLDPE, of a hydrogenated resin + additives | 1 |
| C | adhesion resin | 0.5 |
| D | EVAL | 1 |
| E | adhesion resin | 0.5 |
| F | Mixture of LLDPE, of a hydrogenated resin + additives | 1 |
| Base layer | Polypropylene | 23 |
| A | Mixture of LLDPE, a hydrogenated resin + additives | 1 |
| Filmproperties | | |
| Oxygen permeability ($cm^3/m^2 \cdot d \cdot bar$) | | 23 |
| High-pressure sealing Sealing strength N/15 mm | | |
| 90° C. | | 3.0 |

TABLE-continued

| layer structure | layer thickness in μm |
|---|---|
| 100° C. | 3.4 |
| 110° C. | 3.8 |
| Gloss (GU) | 82 |
| Haze % | 3.8 |

We claim:

1. Heat sealable at least monoaxially orientated multilayer film consisting of propylene polymers as the base layer, on at least one surface of which a layer combination is arranged which from the outside towards the base layer, is composed of (A) a heat sealable outer layer of
  (a) 66.5 to 94.5% by weight of a linear statistical ethylene copolymer with a low density (LLDPE),
  (b) 5 to 30% by weight of a low molecular weight resin which is compatible with the LLDPE, with the exception of a low molecular weight resin of α-olefins having at most 3 C-atoms,
  (c) 0.3 to 2% by weight of a mixture of a polyethylene wax and an oxazoline wax,
  (d) 0.2 to 1.5% by weight of a polydiorgano-siloxane and
  (e) optionally customary additives and auxiliaries, the sum of components (a) to (d) always amounting to 100% weight,
(B) optionally a layer of a propylene polymer,
(C) an adhesion layer containing modified polyolefin,
(D) a gas-barrier layer based on a saponified ethylene vinyl acetate copolymer containing 40 to 85 mol% of vinyl acetate units which are saponified to an extent of at least 90%,
(E) an adhesion layer containing a modified polyolefin, and optionally
(F) a layer of LLDPE and optionally components (b)-(e) in the above mentioned amount, the base layer optionally carrying on its other surface a sealable layer A, a layer combination A to E, a layer combination A to F or a layer combination B to D or a layer combination E and D or a layer of a mixture of the polymers of layers C and D.

2. Multilayer film as claimed in claim 1, wherein layer A contains 78-89.1% by weight of component (a), 10-20% by weight of component (b), 0.5-1% of component (c), and 0.4-1% of component (d).

3. Multilayer film as claimed in claim 1, wherein the LLDPE of layer(s) A and F is a linear statistical ethylene copolymer with up to 12 mol%, preferably 2-8 mol%, of further α-olefins with $C_3$ to $C_{10}$, preferably with propylene, 1-butene, pentene, hexene, octene, nonene, decene or 4-methyl-1-pentene.

4. Multilayer film as claimed in claim 3, wherein component (a) has a density lower than 0.94, preferably a density of 0.900 to 0.925, particularly preferably 0.903 to 0.92 g/cm$^3$.

5. Multilayer film as claimed in claim 1, wherein as component (b) natural or synthetic resins with a softening point of 60° to 180° C. and selected from the group resin, dammar resins, turpentine resins, hydrocarbon resins, ketone resins, phenolic resins, chlorinated aliphatic or aromatic hydrocarbon resin, preferably a polycyclic hydrogenated hydrocarbon resin based on cyclopentadiene is used.

6. Multilayer film as claimed in claim 1, wherein as component (c) a mixture of a polyethylene wax and an oxazoline wax prepared from stearic acid and an amino alcohol, preferably tris-hydroxymethylaminomethane is used.

7. Multilayer film as claimed in claim 1, wherein the gas barrier layer D is based on an ethylene/vinyl acetate copolymer which consists of 60-75 mol% of vinyl acetate units which are saponified to an extent of more than 95 mol%, and optionally contain polyvinyl alcohol or polyamides.

8. Multilayer film as claimed in claim 1, wherein the layer C and E consist of homo- or copolyolefins containing carboxyl groups, preferably polypropylene or polyethylene which contain, in a grafted form, at least one monomer from the group comprising the α,β-monounsaturated dicarboxylic acids, preferably maleic acid, fumaric acid, itaconic acid or their acid anhydrides, acid esters, acid amides and acid imides; copolymers of ethylene and α,β-monounsaturated carboxylic acids, preferably acrylic acid, methacrylic acid and/or their metal salts (Zn, Na) and/or their alkyl ($C_1$–$C_4$) esters; corresponding graft polymers of said monomers on polyolefins, preferably polyethylene or polypropylene; or partially saponified ethylene/vinyl acetate copolymers, which are optionally graft-polymerised with a monomer of the above mentioned unsaturated acids and have a low degree of saponification; or mixtures of the mentioned polymers.

9. Multilayer film as claimed in claim 1, wherein layers A and C and/or layers B and C and/or layers E and F or layers C and D and/or layers D and E are combined to form one layer by mixing the corresponding polymers.

10. Packaging material of multilayer films as claimed in claim 1.

* * * * *